Dec. 31, 1935.  W. PETERSEN  2,026,358
ELECTRIC VALVE CONVERTING APPARATUS
Filed Dec. 16, 1932
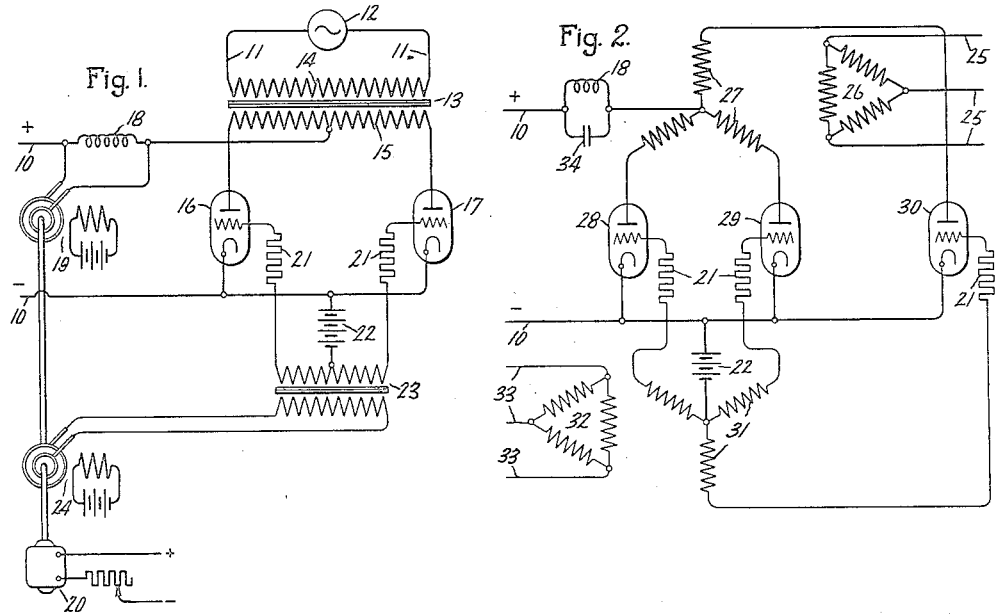
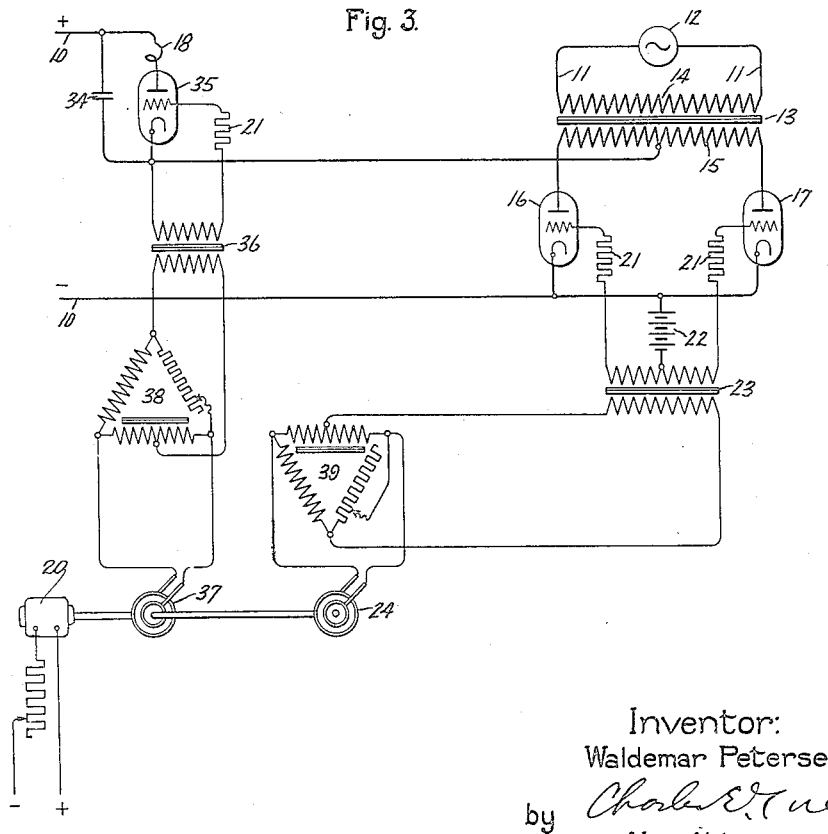
Inventor:
Waldemar Petersen,
by Charles E. Tullar
His Attorney.

Patented Dec. 31, 1935

2,026,358

UNITED STATES PATENT OFFICE 2,026,358

ELECTRIC VALVE CONVERTING APPARATUS

Waldemar Petersen, Berlin, Germany, assignor to General Electric Company, a corporation of New York Application December 16, 1932, Serial No. 647,587
In Germany January 25, 1932

7 Claims. (Cl. 175—363)

My invention relates to electric valve converting apparatus and more particularly to such apparatus adapted to transmit energy from a direct current supply circuit to an alternating current load circuit.

Heretofore there have been proposed numerous arrangements including electric valves suitable for transmitting energy from a direct current supply circuit to an alternating current load circuit. The use of vapor electric discharge valves in such arrangements has been found particularly advantageous because of the relatively large amounts of energy which may be handled at ordinary operating voltages. On the other hand, in such electric valve converting apparatus employing vapor electric discharge valves, it is ordinarily necessary to provide some means for commutating the current between the several electric valves, unless the load circuit is provided with a source of counter-electromotive force for effecting this commutation and the apparatus operates under predetermined power factor conditions. My invention relates more particularly to a new and improved electric power converting apparatus employing a simplified arrangement for commutating the current between the several electric valves.

It is an object of my invention, therefore, to provide an improved electric valve converting apparatus including a new and improved arrangement for commutating the current between the several electric valves.

It is another object of my invention to provide an electric valve converting apparatus including a simplified arrangement for commutating the current between the several electric valves, in which the size and cost of the commutating means may be materially reduced.

In accordance with my invention, direct and alternating current circuits are interconnected through an electric valve converting apparatus of the conventional type known as a parallel inverter, including the usual current smoothing inductance device in the connection to the direct current circuit. The means for commutating the current between the several electric valves is connected in parallel with the inductance device and operates at a frequency which is a multiple of that of the alternating current circuit, so that its cost and physical dimensions are considerably decreased. For example, in accordance with one embodiment of my invention, a synchronous frequency determining machine is connected directly in parallel with the smoothing inductance with its counter-electromotive force substantially in phase opposition with that of the inductance device. With such an arrangement, the commutating machine is effective periodically to interrupt the current in any conductive electric valve so that it can easily be started in the next successive valve; that is, commutated between the valves. In accordance with another embodiment of my invention, a capacitor is connected in parallel to the inductance device, the capacitor and inductance device being tuned to a frequency which is a multiple of that of the alternating current circuit. In still another modification of my invention, an inductance device and a capacitor are included in the connection to the direct current circuit and an auxiliary electric valve connected in series with the inductance device. In this arrangement the inductance device and capacitor are tuned to a frequency much higher than that of the alternating current circuit and together they are effective periodically to interrupt the current in the conductive electric valves of the converting apparatus.

For a better understanding of my invention, together with other and further objects thereof, reference is had to the following description taken in connection with the accompanying drawing, and its scope will be pointed out in the appended claims. Fig. 1 of the drawing illustrates an electric valve converting apparatus embodying my invention in which commutation is effected by means of a synchronous dynamo-electric machine; Fig. 2 shows a modification in which a synchronous machine is replaced by a capacitor, while Fig. 3 illustrates a further modification in which an auxiliary electric valve is used to aid in the commutation.

Referring now more particularly to Fig. 1 of the drawing, there is illustrated an arrangement embodying my invention for transmitting energy from a direct current supply circuit 10 to an alternating current load circuit 11 which may be connected to any desired load circuit illustrated diagrammatically as a device 12. This apparatus comprises a transformer 13 provided with a secondary winding 14 connected to the alternating current circuit 11 and a primary winding 15 provided with an electrical neutral connected to one side of the direct current circuit and with end terminals connected to the other side of the direct current circuit through the electric valves 16 and 17. The valves 16 and 17 are each provided with an anode, a cathode and a control grid and may be of any of the several types well known in the art, although I prefer to utilize valves of the vapor electric discharge type. A current smoothing reactor or inductive winding 18 is included in one of the connections to the direct current supply circuit, for example, the connection to the electrical neutral of the winding 15. In parallel to the inductive winding 18 is connected a synchronous generator 19 which may be driven from any suitable means, such for example, as a variable speed direct current motor 20.

In order periodically to render the valves 16 and 17 alternately conductive and nonconductive, their grids are connected to their common cathode circuit through current limiting resistors 21, a negative bias battery 22 and opposite halves of the secondary winding of a grid transformer 23, the primary wind of which may be energized from any suitable source of a frequency which it is desired to supply the circuit 11, such for example, as a synchronous generator 24. In order to keep the electromotive forces of the generators 19 and 24 properly synchronized, with the generator 19 supplying an electromotive force of a frequency double that supplied by the generator 24, they may be conveniently mounted on a common shaft driven by the motor 20.

The general principles of operation of the above described apparatus for transmitting energy from the direct current circuit 10 to the alternating current circuit 11 will be well understood by those skilled in the art. In brief, if one of the valves, for example, the valve 16, be initially rendered conductive, current will flow from the positive side of the direct current circuit 10 through the left hand portion of the winding 15 and the electric valve 16, inducing a half cycle of alternating current in the transformer 13. Substantially 180 electrical degrees later electric valve 17 will be rendered conductive and the current will be transferred from the valve 16 to the valve 17, flowing through the right hand portion of the winding 15 and inducing a half cycle of alternating current of opposite polarity in the transformer 13. In this manner current will be periodically transferred between the valves 16 and 17 at a frequency depending upon the excitation of the grid transformer 23 derived from the generator 24. The inductive winding 18 is effective to draw a substantially constant unidirectional current from the supply circuit 10. If, at the time it is desired to interrupt the current in the valve 16 and start the current in the valve 17, the counter-electromotive force of the generator 19 is negative, that is, less than the counter-electromotive force of the circuit including the left hand portion of the winding 15 and the valve 16, the current flowing in the inductive winding 18 will be momentarily diverted into the machine 19; that is, the potential of the right hand terminal of the winding 18 will be depressed to such an extent that the anode of the valve 16 becomes negative with respect to its cathode and the current is interrupted therein. By properly synchronizing the potential supplied by the grid transformer 23 with that of the generator 19, the grid of the valve 16 may be rendered negative and the grid of the valve 17 positive simultaneously with the interruption of current in the valve 16 with the result that, when the counter-electromotive force of the generator 19 again rises, current will restart in the valve 17. In this manner the synchronous machine 19 is effective periodically to interrupt the current in whichever valve is conductive to enable its grid to regain control and transfer the current to the other valve. It is apparent that the electromotive force supplied by the generator 19 must have a frequency twice that supplied by the generator 24.

In Fig. 2 there is illustrated a modification of my invention for transmitting energy from a direct current supply circuit 10 to a three phase alternating current circuit 25. This apparatus is an inverting apparatus of the parallel type as illustrated and described in Fig. 1, and includes a transformer comprising a three phase secondary network 26 connected to the alternating current circuit 25 and a three phase primary network 27 provided with an electrical neutral connected to one side of the direct current circuit 10 through the inductive winding 18 and with end terminals connected to the other side of the direct current circuit through electric valves 28, 29 and 30. The electric valves 28, 29 and 30 are also preferably of the three electrode vapor electric discharge type. The grids of the valves 28, 29 and 30 are connected to their common cathode circuit through current limiting resistors 21, the negative bias battery 22 and the secondary network 31 of a three phase transformer, the primary network 32 of which is connected to any suitable alternating current circuit 33 of a frequency which it is desired to supply to the circuit 25. In this arrangement the synchronous machine connected in parallel to the inductive winding 18 as illustrated in Fig. 1 is replaced by a capacitor 34, which is tuned with the inductive winding 18 to a frequency substantially three times that of the alternating current circuit 33. In this arrangement, the current in the capacitor 34 is in phase opposition to the alternating component of the current in the inductive winding 18, and will be effective to absorb completely the current drawn from the supply circuit 10 periodically to interrupt the current in the particular one of the valves 28, 29 or 30, which is conductive, in order that its grid may regain control and the current be transferred to another of the electric valves.

In Fig. 3 is illustrated a modification of the commutating arrangement shown in Fig. 2 applied to a single phase electric valve inverter of the type illustrated in Fig. 1. In this arrangement the inductive winding or smoothing reactor 18 and the capacitor 34 are tuned to a very much higher frequency than in the arrangement of Fig. 2, and an auxiliary vapor electric valve 35 is connected in series with the inductive winding 18. The grid of the valve 35 may be connected to its cathode through a current limiting resistor 21 and the secondary winding of the grid transformer 36, the primary winding of which may be energized from a pilot generator 37 through a suitable phase shifting arrangement, such for example, as the impedance phase shifting circuit circuit 38. If desired, a phase shifting arrangement 39 may be interposed between the pilot generator 24 and the primary winding of the grid transformer 23. It will be understood that, as in the previous arrangements, the frequency at which the commutating circuit operates and thus the frequency supplied by the generator 37, will be equal to that supplied by the generator 24 to the grid transformer 23 multiplied by the number of valves included in the inverting apparatus; that is, in the particular arrangement illustrated in Fig. 3, it will be twice the frequency of the generator 24. In the operation of this arrangement, if one of the electric valves, for example, valve 16, is initially rendered conductive, the capacitor 34 becomes charged during the interval in which the valve 16 is conducting and, when it becomes completely charged, automatically interrupts the current therein. When it is desired to initiate the current in the valve 17, the electric valve 35 is rendered conductive and the energy stored in the capacitor 35 will complete one oscillation in the tuned circuit comprising the capacitor 34 and reactor 18, reversing the polarity of the charge on the capacitor 34. The oscillation cannot continue due to the unilateral conductivity characteristics of the valve 35. The capacitor 34 and reactor 18 are preferably tuned to a frequency such that this oscillation takes place within a very small fraction of a cycle of the alternating current circuit of the inverting apparatus. The reversal of the potential of the capacitor 34 places it in a condition to again be charged from the direct current circuit 10, the charging current flowing through the right hand portion of the inductive winding 15 and electric valve 17. In this manner the current may be successively commutated between electric valves 16 and 17. The energy transferred between the two circuits may be controlled by adjusting the point in the cycle at which electric valve 35 is made conductive with respect to the control of the electric valves 16 and 17 and thus controlling the point in the cycle at which the current is commutated between the valves 16 and 17.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. An electric valve converting apparatus for transmitting energy from a direct current supply circuit to an alternating current load circuit comprising a transformer having an electrical neutral connected to said supply circuit, a group of similarly connected electric valves interconnecting said transformer and a connection to said supply circuit, means for rendering said valves alternately conductive and nonconductive in a predetermined sequence, an inductance device interposed in series with one of the connections from the supply circuit to the apparatus, and commutating means connected in parallel to said inductance device, said commutating means operating at a frequency which is a multiple of said alternating current load circuit.

2. An electric valve converting apparatus for transmitting energy from a direct current supply circuit to an alternating current load circuit comprising an inductive winding provided with an electrical neutral, a group of similarly connected electric valves interconnecting the terminals of said winding with one side of said direct current circuit, the other side of said direct current circuit being connected to said electrical neutral, means for rendering said valves alternately conductive and nonconductive in a predetermined sequence, an inductance device interposed in series with the connection from the supply circuit to said electrical neutral, and commutating means connected in parallel to said inductance device.

3. An electric valve converting apparatus for transmitting energy from a direct current supply circuit to an alternating current load circuit comprising a transformer having an electrical neutral connected to said supply circuit, a group of similarly connected electric valves connected between said transformer and a connection to said supply circuit, means for rendering said valves alternately conductive and nonconductive in a predetermined sequence, and means for commutating the current between said valves comprising a smoothing inductance device interposed in series with one of the connections from the supply circuit to the apparatus, and a dynamo-electric machine connected in parallel to said inductance device and having an electromotive force of a frequency equal to a multiple of that of the alternating current circuit.

4. An electric valve converting apparatus for transmitting energy from a direct current supply circuit to an alternating current load circuit comprising a p-phase inductive winding, a group of similarly connected electric valves interconnecting said circuits through said winding, means for rendering said valves alternately conductive and nonconductive in a predetermined sequence, and means for commutating the current between said valves comprising an inductance device interposed in series with one of the connections from said supply circuit to the apparatus, and a synchronous generator connected in parallel to said inductance device, having a counter-electromotive force substantially out of phase with the reactive electromotive force of said device and a frequency $p$ times that of the alternating current circuit.

5. An electric valve converting apparatus for transmitting energy from a direct current supply circuit to an alternating current load circuit comprising an inductive winding, a group of similarly connected electric valves interconnecting said circuits through said winding, means for rendering said valves alternately conductive and nonconductive in a predetermined sequence, and means for commutating the current between said valves comprising an inductance device interposed in series with one of the connections from the supply circuit to the apparatus, and a capacitor connected in parallel to said inductance device, said inductance device and capacitor being tuned to a frequency which is a multiple of that of said alternating current circuit.

6. An electric valve converting apparatus for transmitting energy from a direct current supply circuit to an alternating current load circuit comprising an inductive winding, a group of similarly connected electric valves interconnecting said circuits through said winding, means for rendering said valves alternately conductive and nonconductive in a predetermined sequence, and means for commutating the current between said valves comprising a capacitor connected in series with one of the connections from the supply circuit to the apparatus, an inductance device and an auxiliary electric valve connected in parallel to said capacitor, said inductance device and capacitor being tuned to a frequency substantially higher than that of said alternating current circuit, and means for controlling the conductivity of said auxiliary electric valve at a frequency which is a multiple of that at which said group of valves is controlled.

7. An electric valve converting apparatus for transmitting energy from a direct current supply circuit to an alternating current load circuit comprising a p-phase inductive winding, a group of similarly connected electric valves interconnecting said circuits through said winding, means for rendering said valves alternately conductive and nonconductive in a predetermined sequence, and means for commutating the current between said valves comprising a capacitor connected in series with one of the connections from the supply circuit to the apparatus, an inductance device and an auxiliary electric valve connected in parallel to said capacitor, said inductance device and capacitor being tuned to a frequency of a higher order of magnitude than that of said alternating current circuit, and means for controlling the conductivity of said auxiliary electric valve at a frequency of $p$ times that of said alternating current circuit.

WALDEMAR PETERSEN.